United States Patent [19]

Moreira

[11] Patent Number: 5,627,543
[45] Date of Patent: May 6, 1997

[54] METHOD OF IMAGE GENERATION BY MEANS OF TWO-DIMENSIONAL DATA PROCESSING IN CONNECTION WITH A RADAR WITH SYNTHETIC APERTURE

[75] Inventor: Alberto Moreira, Garching, Germany

[73] Assignee: Deutsche Forschungsanstalt für Luft-und Raumfahrt e.V., Köln, Germany

[21] Appl. No.: 510,698

[22] Filed: Aug. 3, 1995

[30] Foreign Application Priority Data

Aug. 5, 1994 [DE] Germany ............... 44 27 657.5

[51] Int. Cl.⁶ .................................................. G01S 13/90
[52] U.S. Cl. .................................................. 342/25
[58] Field of Search ......................... 342/25, 195, 196, 342/191

[56] References Cited

U.S. PATENT DOCUMENTS 5,327,140  7/1994  Buckreu ....................... 342/25
5,394,151  2/1995  Knaell et al. ................. 342/25

OTHER PUBLICATIONS

Chialin Wu et al, Modeling and a Correlation Alogorithm for Spaceborne SAR Signals, AES, vol. AES–18, No. 5, pp. 563–575, Sep. 1982.

C. Cafforio et al, SAR Data Focusing Using Seismic Migration Techniques, AES, vol. 27, No. 2, pp. 194–207, Mar. 1991.

R. Keth Raney, Precision SAR Processing Using Chirp Scaling, IEEE, vol. 32, No. 4, pp. 786–799, Jul. 1994.

Stefan Buckreuss, Motion Errors in an Airborne Synthetic Apeture Radar System, ETT, vol. 2, No. 6, pp. 655–664, Nov.–Dec. 1991.

*Primary Examiner*—Ian J. Lobo
*Attorney, Agent, or Firm*—Browdy and Neimark

[57] ABSTRACT

In connection with a method for image generation by means of two-dimensional data processing, received SAR data are multiplied by a phase correction ($H_{mc}$) for a reference range ($r_{ref}$) for the insertion of a motion compensation and for processing at a high drift angle, and an additional cubic phase term is inserted for compensating a range migration. The entire range migration is then eliminated by means of an additional linear frequency displacement; subsequently the SAR data are transformed back into the "range-Doppler" domain. A remaining phase error, created by a "chirp scaling" correction, is corrected, the SAR data are transformed back into the time domain and a phase correction as a function of the range is performed by multiplication for the exact motion compensation in the time domain. The one-dimensional reference function is performed in the frequency domain for azimuth compression, by means of which two-dimensional SAR data are obtained.

4 Claims, 4 Drawing Sheets

METHOD OF IMAGE GENERATION BY MEANS OF TWO-DIMENSIONAL DATA PROCESSING IN CONNECTION WITH A RADAR WITH SYNTHETIC APERTURE

FIELD OF THE INVENTION

The invention relates to a method for image generation by means of two-dimensional data processing in connection with a radar with synthetic aperture (SAR).

DESCRIPTION OF THE RELATED ART

An SAR system has a platform, such as an airplane, a helicopter, a satellite, or the like, which moves at a speed as constant as possible, a downward pointing antenna inclined transversely to the direction of flight and a coherent radar system periodically emitting electromagnetic pulses (pulsed operation). In this case the direction of movement of the platform is identified as the azimuth direction and the direction extending orthogonally to it, i.e. the direction transversely to the direction of flight, as the range direction. Reflected radar echoes are received, converted into a frequency, i.e. mixed, quadrature-modulated and digitized. This results subsequently in digital raw SAR data, which consist of an in-phase and a quadrature-phase channel because of the quadrature modulation.

An SAR image is generated from the raw SAR data by means of digital processing. However, at present digital processing is very expensive and can only be performed in real time, i.e. "on line", with considerable hardware outlay. SAR data processing here consists of two steps, namely compression respectively in the range and in the azimuth direction.

In the first step in the range direction the transmitted signal, which is frequency-modulated and therefore time dispersed, is compressed into one pulse. This corresponds to processing in accordance with optimal filter theory, wherein the resolution of the compressed pulse is inversely proportional to the band width of the transmitted signal.

In the second step in the azimuth direction a long synthetic antenna is formed so that high resolution in the azimuth direction is obtained. This processing is performed in accordance with the optimal filter theory. In this case the resolution of the compressed azimuth signal is inversely proportional to the azimuth band width which is achieved by the Doppler frequency shift.

However, a number of additional steps, which will be briefly described below, are required in azimuth processing in order to obtain a high image quality. The signal flow for SAR data processing is available in the shape of a bent curve, because the radar system approaches and moves away from each target object in the course of forming the synthetic aperture. This curve, which is called a range migration, can be represented by the following Eq. (1):

$$r = \sqrt{r_o^2 + x^2} \quad (1)$$

wherein $r_o$ is the shortest distance between the target object and the radar system, x is the azimuth position and r the range variation. To simplify azimuth processing, the range migration is corrected prior to actual processing.

The determination of the so-called Doppler centroid is decisive for the azimuth distribution so that the received signal can be adapted to the azimuth filter. If a wrong value of the Doppler centroid is used in azimuth processing, a deterioration of the signal/noise ratio, geometric resolution and also ambiguities in the processed image must be expected.

The Doppler centroid corresponds to the value of the Doppler frequency in the center of the azimuth illumination. The angle measured, starting at the antenna center, between the target object in the center of the azimuth illumination and the position transversely to the direction of flight is called the drift angle. Because of the SAR geometry the Doppler centroid varies with distance and, if the SAR platform is unstable, the Doppler centroid also changes with the azimuth position.

Phase errors are generated because of deviations of the SAR platform from the set flow, which are compensated by appropriate phase correction after compression in the distance direction, so that a fully focused image is obtained. Motion compensation is primarily necessary in connection with aircraft-borne SAR systems, since a very stable flow motion is obtained with satellite-borne systems.

SAR data processing can basically be performed in a time or a frequency domain. A folding operation is used for the range and azimuth compression in the time domain, wherein a time correlation of the received signal with a corresponding reference function is performed.

In range compression the reference function corresponds to the complex-conjugated, time-inverted replica of the transmitted pulse. In azimuth processing the complex-conjugated time-inverted function of the received azimuth signal is applied to a pulse corresponding to the system response. Since the calculation effort for the convolution operation rapidly increases with the number of the points of the reference function, data processing is performed in most cases in the frequency domain.

In the frequency domain the fast Fourier transformation (FFT) is used, since convolution in the time domain corresponds to a multiplication in the frequency. The signal is then converted by means of FFT in the frequency domain, multiplied by the reference function and subsequently returned by means of the inverse FFT (IFFT) into the time domain. In most cases processing in the frequency domain can be performed considerably faster than in the time domain. Therefore only processing in the frequency domain is considered in what follows.

At present mainly three algorithms are employed for SAR data processing, namely the "range-Doppler" algorithm, the "wave number" algorithm and the "chirp scaling" algorithm.

The "range-Doppler" algorithm consists of a one-dimensional range azimuth compression in the frequency domain (see the publication by C. Wu, K. Y. Liu and M. Jin "Modelling and a Correlation Algorithm for Space-Borne SAR Signal", in IEEE Trans. on Aerosp. and Electron. Systems, vol. AES-18, No. 5, 1982, pp. 563 to 575). In this algorithm the range migration in the "range-Doppler" domain is corrected prior to azimuth compression by means of an interpolatioin. The "range-Doppler" domain corresponds to the signal domain after the azimuth FFT, i.e. the SAR data in the range direction are available in the time domain, while the SAR data in the azimuth direction are already transformed into the frequency domain.

With the "wave number" algorithm, a two-dimensional FFT is first performed. The actual range and azimuth compression is performed by means of a phase multiplication and interpolation in this signal domain (the "wave number" domain). The image data are obtained after a two-dimensional IFFT (see the publication by C. Cafforio, C. Prati and F. Rocca "SAR Data Focusing Using Seismic Migration Techniques", in IEEE Trans. Aerosp. and Electron. Systems, vol. AES-27, 1991, pp. 199 to 207).

With the "chirp-scaling" algorithm the interpolation in SAR data processing is avoided, which results in very accurate image processing (see German Patent Publication DE 41 22 592). Before the raw SAR data in the range direction are compressed, the raw SAR data in the "range-Doppler" domain are transformed by means of an azimuth FFT.

In this domain the data are multiplied with a phase function, which displaces the phase center of the signal in the range direction in such a way that the range migration is compensated for the entire range domain. Following this operation, the data in the range direction are compressed in the "wave number" domain by means of a subsequent azimuth compression. Following a phase correction in the "range-Doppler" domain, the image data are obtained by an azimuth IFFT. This algorithm results in an excellent image quality in respect to the phase information, too.

The disadvantage with the "range-Doppler" algorithm is that an interpolation is used and processing is only possible with a moderate drift angle of the platform.

The interpolation for correcting the range migration is very computer-intensive and in many cases results in too strong side lobes in the processed image as well as in incorrect phase information. However, in an interferometric and a polarimetric evaluation of SAR images the phase information is especially important.

With large drift angles, and in particular with SAR systems with a low transmission frequency, the "range-Doppler" algorithm results in a loss in respect to the range resolution. By employing a so-called "secondary range compression", which corresponds to an additional phase correction, this resolution loss can be slightly reduced in the-range compression.

With the "wave number" algorithm it is disadvantageous that there is no variation of the Doppler centroid and that it is necessary to employ an interpolation.

Based on two-dimensional processing in the frequency domain, only one value can be used for the Doppler centroid. Since the Doppler centroid depends on the distance position, this limitation results in a deterioration of the image quality. If the SAR platform is unstable, a deterioration of the image quality as a function of the azimuth direction must be expected, since in this case the Doppler centroid depends on the azimuth position.

If the interpolation for correcting the range migration is very computer-intensive and with the "wave-number" algorithm it also results in high side lobes and also in inaccurate phase information in the processed image. With the "wave number" algorithm the interpolation is performed in the frequency domain and is identified as the Stolt interpolation.

With the "chirp scaling" algorithm it is disadvantageous that there is no variation of the Doppler centroids and no motion compensation.

As with the "wave number" algorithm, only one value can be employed for the Doppler centroid. Since the Doppler centroid depends on the distance position, this limitation leads to a deterioration of the image quality. If the SAR platform is unstable, a deterioration of the image quality as a function of the azimuth position must also be expected.

Because of processing in the frequency domain, the correction of the motion erros can not be inserted in a simple and accurate manner. With the "chirp scaling" algorithm it is also impossible to insert a motion extraction process in an effective way into processing.

OBJECTS AND SUMMARY OF THE INVENTION

It is therefore the object of the invention to create a method for image generation by means of two-dimensional data processing in a radar with synthetic aperture, wherein it is not necessary to employ additional interpolation or block processing in the image generation even with large motion errors and a large drift- angle. In accordance with the invention this is attained in connection with a method for image generation by means of tow-dimensional data processing in a radar with synthetic aperture.

Basically, two-dimensional SAR processing in the frequency domain is employed with the method in accordance with the invention, wherein additional operations, such as fast Fourier transformations (FFTs) and inverse fast Fourier transformations (IFFTs), as well as phase corrections have been inserted in the processing sequence. By means of this, great flexibility and accuracy regarding processing with a variable Doppler centroid in the range and azimuth directions as well as in respect to the extraction and correction of the motion errors is achieved following the complete elimination of the range migration. It is possible in this way to generate images of the highest quality with a small computer outlay.

The method in accordance with the invention offers the advantages of an adaptation to the variations of the Doppler centroid in the range and azimuth directions as well as processing when there is a large drift angle, elimination of the entire range migration prior to the azimuth compression as well as motion extraction.

By widening the azimuth spectrum in the "range-Doppler" domain, it is possible to insert the adaptation to variations in the Doppler centroid in the range direction as a function of the range position in an exact manner into processing. It is furthermore possible by the use of sub-aperture processing in the azimuth direction to compensate the variations in the Doppler centroid as a function of the range, i.e. a new value for the Doppler centroid is applied to each aperture. In this way an adaptation to the different variations of the Doppler centroid in the azimuth direction is achieved. The azimuth length of the sub-apertures in this case depends on the variation rate of the Doppler centroid in the azimuth.

By the insertion of a cubic phase term into the "chirp scaling" operation, i.e. by means of a phase multiplication in the "range-Doppler" domain, it is possible to perform processing at higher drift angles without it being necessary to make additional computer-intensive transformations. The complete removal of the range migration before azimuth compression makes it possible to apply a one-dimensional azimuth reference function. Because of this it is possible perform azimuth processing with little outlay and with reduced memory requirements.

By employing sub-aperture processing in the azimuth it is possible to insert the RDM (Reflectivity Displacement Method) process into processing without it being required to perform additional fast azimuth Fourier transformations (see the publication of J. Moreira "A New Method of Aircraft Motion Error Extraction from Radar Raw Data for Real-Time Motion Compensation" in IEEE Trans. on Geoscience and Remote Sensing, vol. GE-28, No. 4, 1990, pp. 620 to 628). In addition, the method in accordance with the invention makes possible a very exact motion compensation following the range compensation, since the entire range migration is eliminated following this step. In conventional SAR data processing it is not possible to perform a well defined motion compensation for each range position, because the signal flow of each target is stretched over a large range domain because of the range migration.

DETAILED DESCRIPTION OF THE PREFERRED EMBODIMENT

Figure 1:
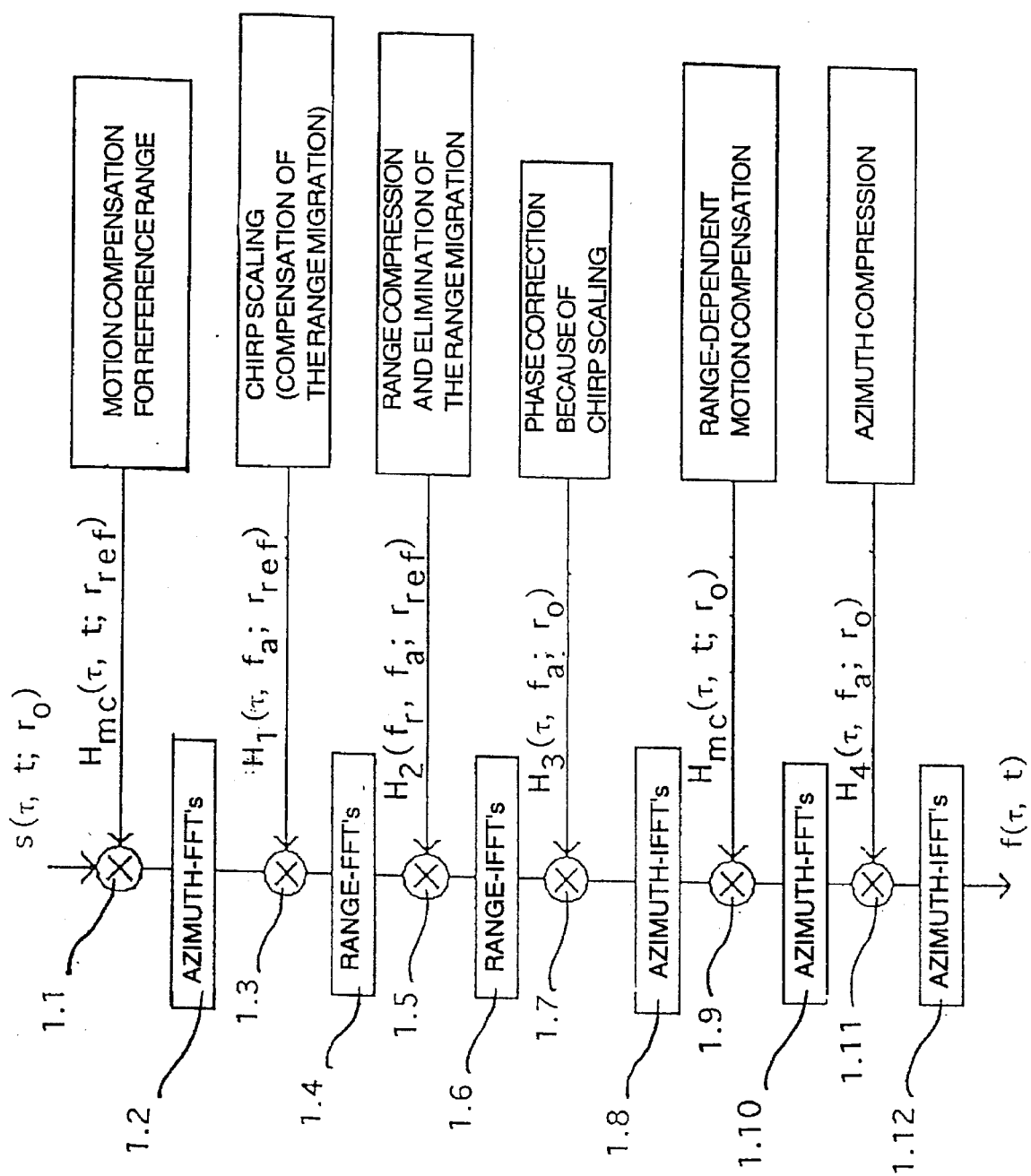
Figure 2:
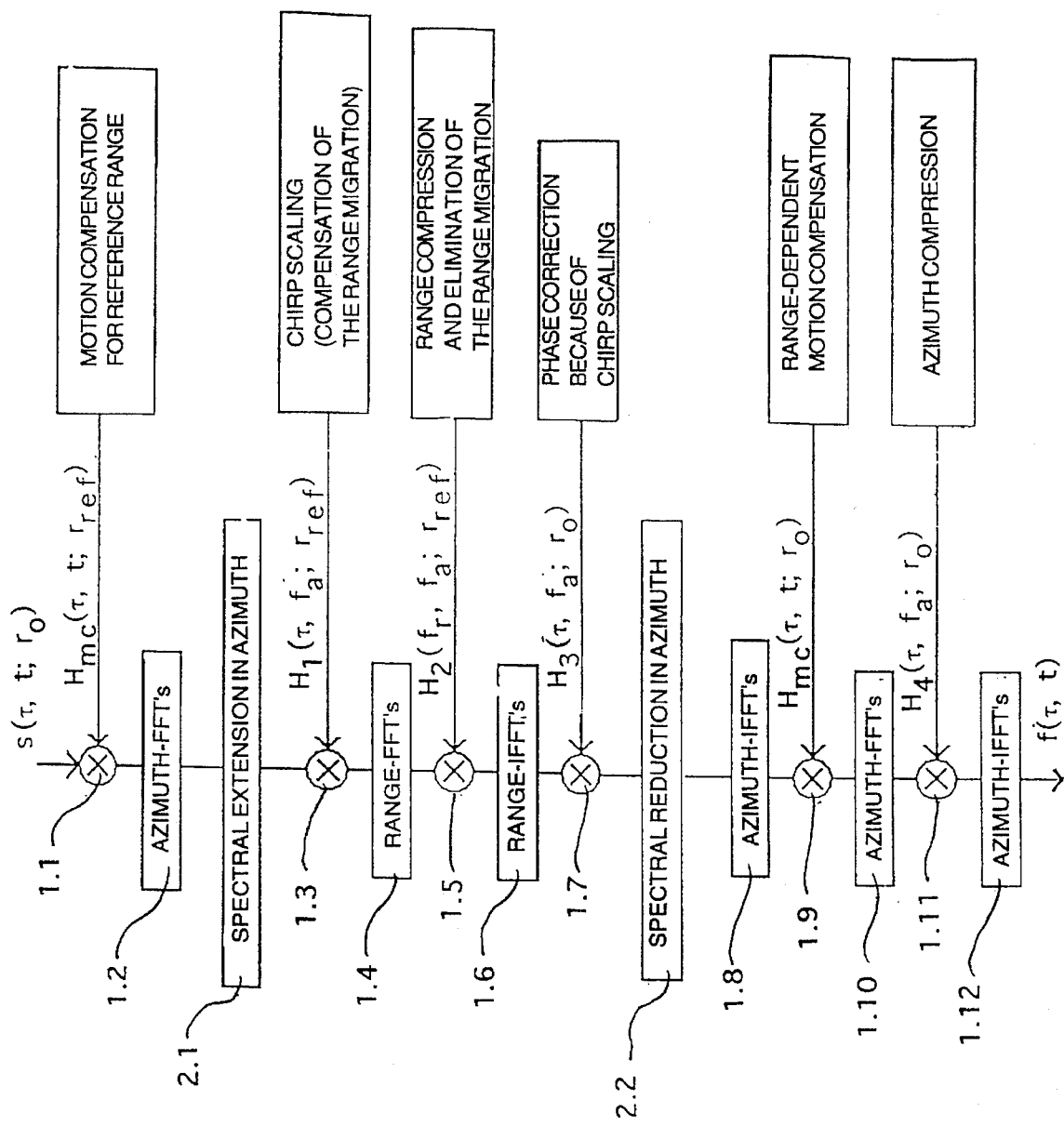

The invention will be explained in detail by means of preferred exemplary embodiments, making reference to the attached drawings. Shown are in:

FIG. 1, in the form of a block diagram, an exemplary embodiment of the method in accordance with the invention regarding the exact SAR data processing with motion compensation even with large drift angles;

FIG. 2, in the form of a further block diagram, an exemplary embodiment of the method in accordance with the invention, wherein in addition to the embodiment of FIG. 1 the exact SAR processing with a variable Doppler centroid in the range direction is performed;

FIG. 3, again in the form of a block diagram, a further exemplary embodiment of the method in accordance with the invention wherein, in addition to the embodiment of FIG. 1 the exact SAR processing with a variable Doppler centroid in the azimuth direction is performed; and FIG. 4, again in the form of a block diagram, still another exemplary embodiment of the method in accordance with the invention wherein, in addition to the embodiment of FIG. 1 a motion extraction process has been inserted into the SAR data processing.

In the exemplary embodiments of FIGS. 1 to 4, the time in the azimuth direction (flying time) is indicated by t, the time in the range direction (echo traveling time) by $\tau$, the azimuth frequency (Doppler frequency) by $f_a$ and the range frequency by $f_r$.

Raw SAR data s ($\tau$, t; r) are first multiplied by a function $H_{mc}$ ($\tau$, t; $r_{ref}$) in a multiplication unit 1.1, by means of which a motion correction for a defined reference range $r_{ref}$ is performed. In this case the function $H_{mc}$ can be calculated from inertial navigation data in the aircraft. The motion correction can be performed here only for a reference range $r_{ref}$ since a range compression has not yet been performed.

Following multiplication by the function $H_{mc}$ in the unit 1.1, the SAR data are transformed by means of a fast azimuth Fourier transformation (Block 1.2) into a "range-Doppler" domain. After this the data are multiplied by the function $H_1$ in a second multiplication unit 1.3, by means of which the phase center of the SAR data is displaced in such a way that the range migration is compensated for the entire range domain. This corresponds to a linear scaling factor $a(f_a)$ in accordance with the following Eq. (2):

$$a(f_a) = \frac{1}{\sqrt{1 - \left(\frac{\lambda \cdot f_a}{2 \cdot v}\right)^2}} - 1 \qquad (2)$$

wherein the platform speed is indicated by v and the wave length by $\lambda$.

With the aid of Eqs. (1) and (2) the range migration $R(f_a; r_o)$ is obtained with the aid of Eq. (3):

$$R(f_a; r_o) = r_o \cdot (1 + a(f_a)) \qquad (3)$$

In the "range-Doppler" domain the SAR data have a modulation rate $k(f_a; r_{ref})$ in the range direction, which is a function of the range and the azimuth frequency, so that the function $H_1(\tau, f_a; r_{ref})$ for compensating the range migration can be represented as follows by Eq. (4) represented below $$H_1(\tau, f_a; r_{ref}) = \qquad (4)$$

$$\exp\left[-j \cdot \pi \cdot k(f_a; r_{ref}) \cdot a'(f_a) \cdot \left(\tau - \frac{2 \cdot R'(f_a; r_{ref})}{c}\right)^2\right] \cdot$$

$$\exp\left[-j \cdot \pi \cdot k_r^2 \cdot \frac{\lambda \cdot (\beta^2 - 1)}{3 \cdot c \cdot \beta^3} \cdot \left(\tau - \frac{2 \cdot R'(f_a; r_{ref})}{c}\right)^3\right]$$

wherein c indicates the speed of light and $k_r$ the modulation rate of the transmitted "chirp scaling" signal. In accordance with Eq. (5), the parameter $\beta$ is defined as follows:

$$\beta = \sqrt{1 - \left(\frac{\lambda \cdot f_a}{2 \cdot v}\right)^2} \qquad (5)$$

The first term in Eq. (4) corresponds to the phase correction in accordance with the "chirp scaling" method, while the second term has been newly added by the method of the invention so that processing with a high drift angle can be performed with sufficient accuracy.

After the range migration has been compensated by means of the function $H_1$, the SAR data are transformed into the "wave number" domain by means of fast range Fourier transformations (FFTs, block 1.4). The range compression is then performed in this domain and the entire range migration is eliminated. The elimination is possible by means of a linear displacement in the range direction, since the range migration has already been compensated by means of the function $H_1$, which caused a phase correction, i.e. following this correction the range migration is independent of the range.

In accordance with Eq. (6), the following applies to the phase correction in the "wave number" domain:

$$H_2(f_r, f_a; r_{ref}) = \qquad (6)$$

$$\exp\left[-j \cdot \pi \cdot \left(\frac{1}{k_r \cdot (1 + a'(f_a))} - r_{ref} \cdot \frac{2 \cdot \lambda \cdot (\beta^2 - 1)}{(1 + a'(f_a)) \cdot \beta^3 \cdot c^2}\right) \cdot f_r^2\right] \cdot$$

$$\exp\left[j \frac{4 \cdot \pi \cdot r_{ref} \cdot a'(f_a)}{c} \cdot f_r\right]$$

This correction is performed in a third multiplication unit 1.5. In the next processing step the SAR data are transformed back into the "range-Doppler" domain by means of fast inverse range Fourier transformations (range IFFTs; block 1.6). A remaining phase flow, which was created by the "chirp scaling" correction, is then corrected in a fourth multiplication unit 1.7. In accordance with the following Eq. (7), the phase function for the correction of this remaining phase flow is:

$$H_3 = (\tau, f_a; r_o) = \qquad (7)$$

$$\exp\left[j \cdot \pi \cdot k(f_a; r_{ref}) \cdot (1 + a'(f_a)) \cdot a'(f_a) \cdot \left(\frac{2}{c} \cdot (r - r_{ref})\right)^2\right] \cdot$$

$$\exp\left[-j \cdot \pi \cdot k_r^2 \cdot \frac{8 \cdot \lambda \cdot (\beta^2 - 1)}{c^4 \cdot \beta^3} \cdot (r_o - r_{ref})^3 \cdot \left(a'^2(f_a) - \frac{1}{3}\right)\right]$$

It would be possible to perform the azimuth compression in this process step, too, if no motion compensation were necessary. However, in connection with aircraft-borne SAR systems with an unstable platform the motion compensation is indispensable, so that the SAR data are transformed back into the time domain by means of fast azimuth Fourier transformations (Block 1.8). Then a range-dependent motion compensation $H_{mc}(\tau, t; r_o)$ is performed in a fifth multiplication unit 1.9 in accordance with the following Eq. (8):

$$H_{mc}(\tau, t; r_o) = \exp[j \cdot (\phi_{mc}(\tau, t; r_o) - \phi_{mc}(\tau, t; r_{ref}))] \qquad *8)$$

wherein the motion compensation for the reference range had already been compensated at the start of processing.

After performing further fast azimuth Fourier transformations (Block 1.10), the SAR data are compressed in the azimuth direction. Since the entire range migration has already been eliminated, the azimuth compression $H_4(\tau, f_a; r_o)$ consists of a one-dimensional function with a hyperbolic phase correction. This occurs in the frequency domain by multiplication in a sixth multiplication unit 1.11 with the function $H_4$, which causes a phase correction, in accordance with the following Eq. (9):

$$H_4(\tau, f_a; r_o) = \qquad (9)$$

$$\exp\left[ j \cdot \frac{4 \cdot \pi}{\lambda} \cdot r_o \cdot \left( \sqrt{1 - \left( \frac{\lambda \cdot f_a}{2 \cdot v} \right)^2} - 1 \right) \right]$$

Subsequently the SAR data are transformed back into the time domain by means of further inverse fast azimuth Fourier transformations (IFFTs) (Block 1.12). The function $f(\tau, t)$ at the output of the azimuth IFFT block 1.12 represents the two-dimensional SAR image data in complex format. Thus a reflectivity representation of the imaged area is obtained by means of a detection.

Simulation results show that the method in accordance with the invention leads to an error-free pulse response for drift angles up to 30°, which in general is sufficient for all practical SAR systems. The processing represented in the block diagram of FIG. 1 was formulated by assuming a constant Doppler centroid as a function of the range direction. The Doppler centroid $f_{dc}$ in accordance with Eq. (10) varies as follows as a result of the SAR image geometry:

$$f_{dc}(r_o) = -\frac{2 \cdot v}{\lambda} \cdot (\sin\theta_i \cdot \sin\theta_d + \cos\theta_i \cdot \sin\theta_n) \qquad (10)$$

wherein $\theta_i$ is the angle of incidence of the radar beams on the ground, $\theta_d$ is the drift angle of the platform and $\theta_n$ the pitch angle of the platform.

With conventional two-dimensional SAR processing the value of the Doppler centroid as a function of the range cannot be actualized. Therefore FIG. 2 shows a block diagram of an embodiment of the method in accordance with the invention in which a Doppler centroid depending on the distance can be inserted. A total of six multiplication units 1.1, 1.3, 1.5, 1.7, 1.9 and 1.11 as well as the different FFT or IFFT blocks 1.2, 1.4, 1.6, 1.8, 1.10 and 1.12 are identified in FIG. 2 with the same reference numerals as in FIG. 1. Following the azimuth FFT block 1.2, the azimuth spectrum of the SAR data in the "range-Doppler" domain has been extended by means of a block 2.1 in respect to a spectral extension in the azimuth in such a way that the azimuth frequencies remain unique in spite of the changes of the Doppler centroid. The extension of the azimuth spectrum means that the number of points is artificially increased following each azimuth FFT. By means of this the variation area of the azimuth frequency is extended in accordance with the following Eq. (11):

$$\min[f_{dc}(r_o)] - \frac{PRF}{2} < f_a < \max[f_{dc}(r_o)] + \frac{PRF}{2} \qquad (11)$$

wherein the pulse repetition frequency is indicated by PRF. Because of the spectral expansion, the frequencies $H_1$, $H_2$ and $H_3$ receive the correct frequency allocation and are adapted to the change of the Doppler centroid.

Before the SAR data are transformed back by means of azimuth IFFTs in the time domain following a multiplication by the function $H_3$ in the multiplication unit 1.7, the spectral azimuth length can be reduced, since the range compression at this place has already been performed, i.e. a unique value of the Doppler centroid has been allocated to each range position. The spectral reduction is performed in the block 2.2.

The remaining portion of the processing takes place as in the embodiment of FIG. 1. The phase function $H_4$, however, must assume a corresponding value of the Doppler centroid for each range position, i.e. in accordance with the following Eq. (12), the azimuth frequency variation for the function $H_4$ is:

$$f_{dc}(r_o) - \frac{PRF}{2} < f_a < f_{dc}(r_o) + \frac{PRF}{2} \qquad (12)$$

In spite of the additional operation because of the spectral expansion in the azimuth (Block 2.1), the proposed method is very accurate because a new value for the Doppler centroid is inserted for each range.

Figure 3:
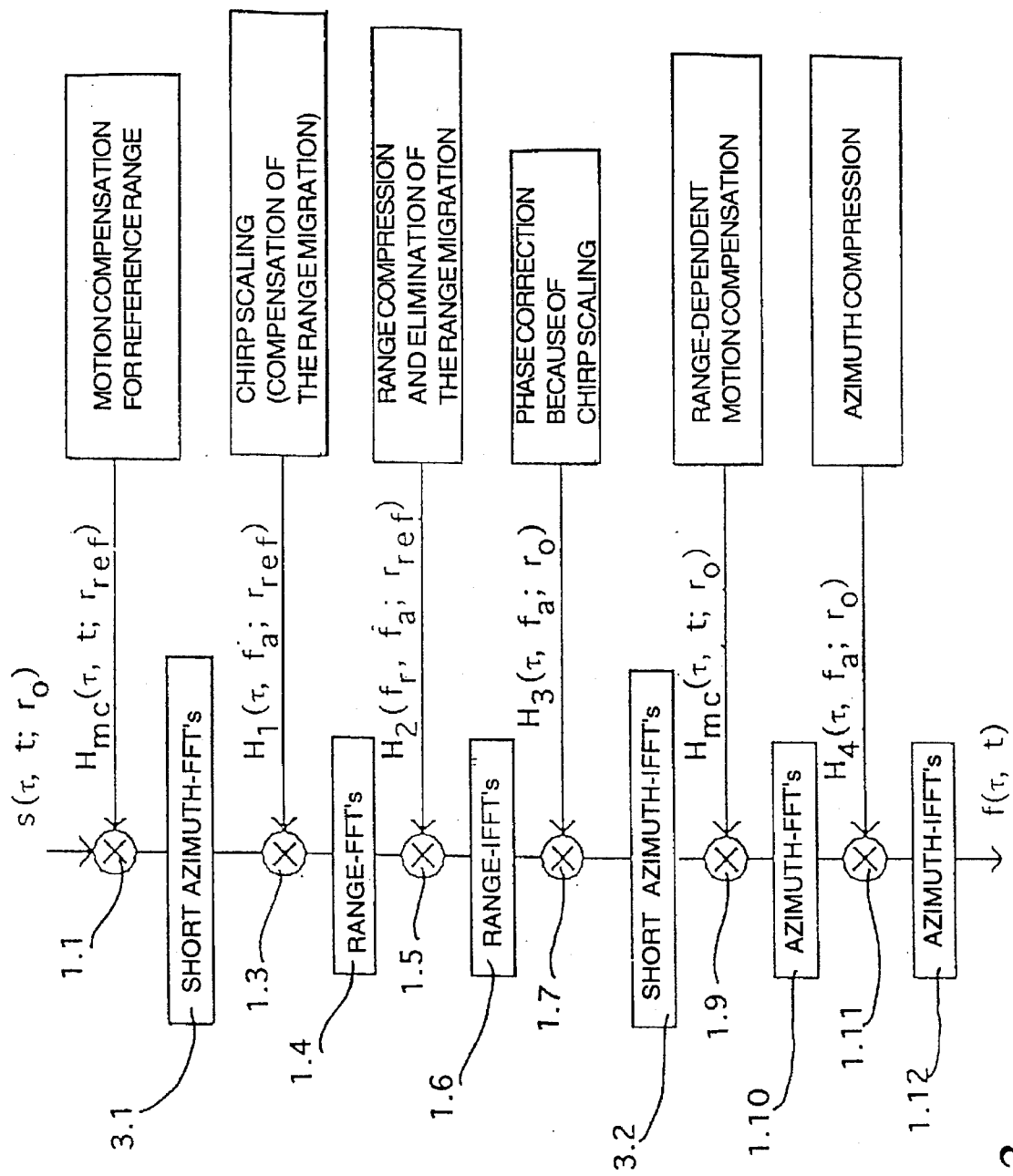

An implementation of the method in accordance with the invention is represented in FIG. 3 in a further block diagram, in which SAR data processing with a variable Doppler centroid in the azimuth direction is performed. The multiplication units and FFT and IFFT blocks in FIG. 3, which correspond to those in FIG. 1 are also identified with the same reference numerals.

This is realized in the block diagram in FIG. 3 by using azimuth FFTs with a small point number (Block 3.1) for a transformation from the time domain to the "range-Doppler" domain. The point number of the azimuth FFTs follows the variation rate of the Doppler centroid, i.e. the point number of each azimuth FFT should be sufficiently small so that a constant value of the Doppler centroid can be assumed in each sub-aperture. Should the variation rate of the Doppler centroid change, the point number of the azimuth FFTs must be correspondingly changed.

The short azimuth FFT transformations are also called sub-apertures, since their point number usually is less than the entire synthetic aperture. The functions $H_1$, $H_2$ and $H_3$ are generated for each sub-aperture, wherein a corresponding Doppler centroid $f_{dc\_i}$ is assumed with each sub-aperture i. In accordance with the following Eq. (13) the scaling factor for the "chirp scaling" function is:

$$a_i(f_a) = \frac{1}{\sqrt{1 - \left( \frac{\lambda \cdot (f_a - f_{dc\_i})}{2 \cdot v} \right)^2}} - 1 \qquad (13)$$

The functions $H_1$, $H_2$ and $H_3$ in accordance with Eq.s (4), (6) and (7) are generated with the new scaling factor in accordance with Eq. (13). Following multiplication by the function $H_3$ in the multiplication unit 1.7, the sub-apertures are transformed back into the time domain by means of short azimuth IFFTs (Block 3.2). The signal flows of the individual sub-apertures are combined so that a continuous signal flow is obtained for the entire data set.

To assure a continuous signal flow during the transition from one sub-aperture to the next it is also necessary to provide overlapping between the sub-apertures. This is the result of the limited band width of the individual sub-apertures. The smaller the sub-apertures are, the greater the required overlapping must be. The results of processing with SAR data have shown that with a sub-aperture of 256 points an overlap of approximately 32 points is required.

Figure 4:
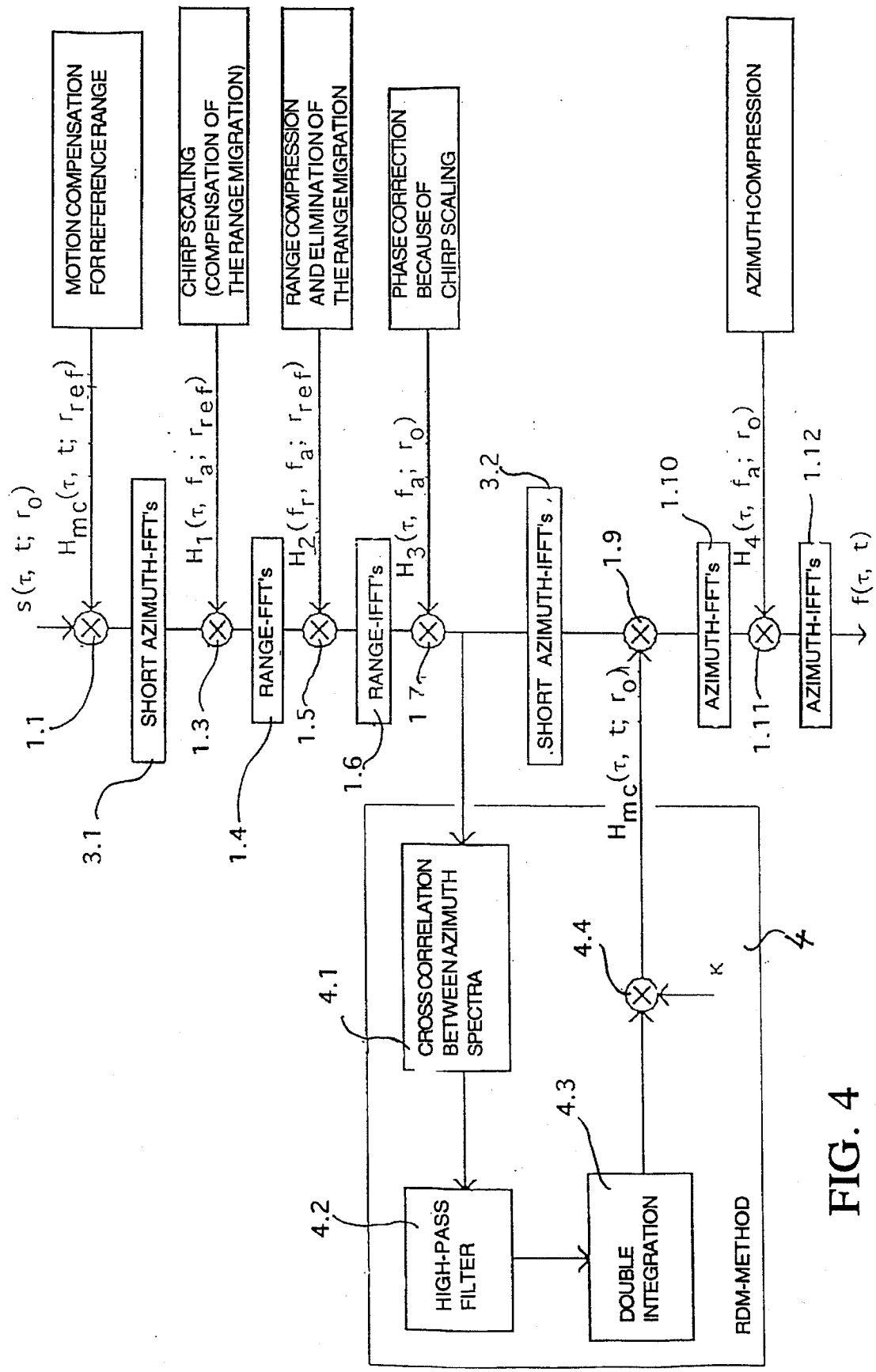

Finally, an exemplary embodiment of the method in accordance with the invention is represented in FIG. 4 in the form of a further block diagram, wherein a motion extraction method has been implemented in processing. The motion extraction method is called the "Reflectivity Displacement Method" (RDM) and performs a cross correlation between adjoining azimuth spectra. In FIG. 4, too, the multiplication units and blocks corresponding to the multiplication units and blocks in FIGS. 1 and 3 are identified by the same reference numerals as in FIGS. 1 and 3.

The point displacement between azimuth spectra which is proportional to the frequency offset $\Delta f_a$ is determined by the unit 4.1, which performs a cross correlation. The correction phase $H_{mc}(\tau, t; r_o)$ for motion compensation is obtained following high-pass filtering of the frequency offset flow in a high-pass filter 4.2 and a double integration (Block 4.3) with a subsequent multiplication by a constant value K in a multiplication unit 4.4.

After the signal flow of the sub-apertures has been transformed back into the time domain by means of short azimuth IFFT (Block 3.2) and has been combined to form the complete aperture, it is possible to perform the motion compensation by means of the correction phase $H_{mc}(\tau, t; r_o)$ in the multiplication unit 1.9.

Because of the use of sub-apertures in the azimuth it is possible by means of the method of the invention in accordance with FIG. 4 to insert the RDM method into processing without it being necessary to perform additional azimuth FFTs.

The methods in accordance with the invention for processing with a variable Doppler centroid in the azimuth range direction as well as with a motion compensation following the total elimination of the range migration and with a motion extraction method can also be employed in connection with other methods for two-dimensional SAR processing, i.e. the exemplary embodiments in FIGS. 1 to 4 are not limited to an implementation in accordance with the "chirp scaling" algorithm.

What is claimed is:

1. A method for image generation by means of two-dimensional data processing in connection with a radar with synthetic aperture SAR, characterized in that, for the insertion of a motion compensation and for processing at a large drift angle, received SAR data $(s(\tau, t; r_o))$, wherein the time in a range direction is identified by $\tau$, the time in the azimuth direction by t and the shortest range between the target subject and the radar system by $r_o$, are multiplied by a phase correction;

$$H_{mc}(\tau, t; r_{ref}) = exp\ [j \cdot \phi_{mc}(\tau, t; r_{ref})]$$

where j describes a complex part and $\phi_{mc}$ is a line-of-sight phase formation compensation for a reference range $(r_{ref})$ in a first multiplication unit;

an additional cubic phase term is inserted via a second multiplication unit following the performance of azimuth FFTs for compensating a range migration by means of a function;

$$H_1(\tau, f_a; r_{ref}) =$$

$$exp\left[-j \cdot \pi \cdot k(f_a; r_{ref}) \cdot a'(f_a) \cdot \left(\tau - \frac{2 \cdot R'(f_a; r_{ref})}{c}\right)^2\right] \cdot$$

$$exp\left[-j \cdot \pi \cdot k_r^2 \cdot \frac{\lambda \cdot (\beta^2 - 1)}{3 \cdot c \cdot \beta^3} \cdot \left(\tau - \frac{2 \cdot R'(f_a; r_{ref})}{c}\right)^3\right]$$

wherein $f_a$ is the azimuth frequency, k is a modulation rate as a function of the range and azimuth frequency, a' is a linear scaling factor, R' the range migration, $k_r$ the modulation rate of a transmitted chirp signal, $\lambda$ the wave length, c the speed of light and $\beta^2$ and $\beta^3$ are respectively a square and a cube of a parameter $\beta$ defined as $$\beta = \sqrt{1 - \left(\frac{\lambda \cdot f_a}{2 \cdot v}\right)^2}$$

wherein v is a platform speed;

following a performance of range FFTs after compensation of the range migration by means of the function $H_1$, the range migration is entirely eliminated by means of an additional linear frequency displacement $(f_r)$ in a function $$H_2(f_r, f_a; r_{ref}) = exp\left[-j \cdot \pi \cdot \left(\frac{1}{k_r \cdot (1 + a'(f_a))} - r_{ref} \cdot \frac{2 \cdot \lambda \cdot (\beta^2 - 1)}{(1 + a'(f_a)) \cdot \beta^3 \cdot c^2}\right) \cdot f_r^2\right] \cdot$$

$$exp\left[j\frac{4 \cdot \pi \cdot r_{ref} \cdot a'(f_a)}{c} \cdot f_r\right]$$

by multiplication in a third multiplication unit;

subsequently the SAR data are transformed back into a two-dimensional range-Doppler domain having coordinates of range time and azimuth frequency, by means of range IFFTs;

a remaining phase flow created by a chirp scaling function is corrected by multiplication in a fourth multiplication unit by a function;

$$H_3 = (\tau, f_a; r_o) =$$

$$exp\left[j \cdot \pi \cdot k(f_a; r_{ref}) \cdot (1 + a'(f_a)) \cdot a'(f_a) \cdot \left(\frac{2}{c} \cdot (r - r_{ref})\right)^2\right] \cdot$$

$$exp\left[-j \cdot \pi \cdot k_r^2 \cdot \frac{8 \cdot \lambda \cdot (\beta^2 - 1)}{c^4 \cdot \beta^3} \cdot (r_o - r_{ref})^3 \cdot \left(a'^2(f_a) - \frac{1}{3}\right)\right]$$

subsequently the SAR data are transformed back into a time domain by means of azimuth IFFTs;

then a range-dependent phase correction $$H_{mc}(\tau, t; r_o) = exp[j \cdot (\phi_{mc}(\tau, t; r_o) - \phi_{mc}(\tau, t; r_{ref}))]$$

is performed by multiplication in a fifth multiplication unit for the exact motion compensation in the time domain;

then, after performing further azimuth FFTs for azimuth compression, a one-dimensional reference function in the frequency domain $$H_4(\tau, f_a; r_o) = \exp\left[ j \cdot \frac{4 \cdot \pi}{\lambda} \cdot r_o \cdot \left( \sqrt{1 - \left( \frac{\lambda \cdot f_a}{2 \cdot v} \right)^2} - 1 \right) \right]$$

is performed by multiplication in a sixth multiplication unit, and following the performance of azimuth IFFTs, two-dimensional SAR data (corresponding to a function $f(\tau, t)$) are obtained.

2. The method in accordance with claim 1, characterized in that, for processing with a variable Doppler centroid in a range domain following the performance of the first azimuth FFTs, a spectral extension of a azimuth spectrum, by means of which the point number after each azimuth FFT is artificially increased is performed in the azimuth direction by determining in accordance with $$f_{dc}(r_o) - \frac{PRF}{2} < f_a < f_{dc}(r_o) + \frac{PRF}{2}$$

of an extended frequency variation $$\min[f_{dc}(r_o)] - \frac{PRF}{2} < f_a < \max[f_{dc}(r_o)] + \frac{PRF}{2}$$

wherein a Doppler centroid is identified by $f_{dc}$ and the pulse repetition frequency by PRF;

the frequency variation of the functions $H_1$, $H_2$ and $H_3$ is increased corresponding to the frequency extension in the azimuth direction;

following a multiplication in the fourth multiplication unit by the function $H_3$ spectral extension in the azimuth direction is removed, and during azimuth processing the function $H_4$ is generated for each range position by multiplication in the sixth multiplication unit by an appropriated value of the Doppler centroid $f_{dc}$ $$f_{dc}(r_o) = -\frac{2 \cdot v}{\lambda} \cdot (\sin \theta_i \cdot \sin \theta_d + \cos \theta_i \cdot \sin \theta_n)$$

wherein $\phi_i$ is the angle of incidence of the radar beams on the ground, $\phi_d$ is the drift angle of the platform and $\phi_n$ the pitch angle of the platform.

3. The method in accordance with claim 1, characterized in that for processing with a variable Doppler centroid in the azimuth direction a transformation of the SAR data ($s(\tau, t; r_o)$) from the time domain to the range-Doppler domain is performed by means of short azimuth FFTs, so that a plurality of sub-apertures in the azimuth direction are created;

a point number in the azimuth direction of the functions $H_1$, $H_2$, and $H_3$ is reduced corresponding to the length of the azimuth FFTs, and the sub-apertures are transformed back into the time domain by means of short azimuth IFFTs and are subsequently combined for forming the entire aperture.

4. The method in accordance with claim 3, characterized in that for inserting a motion extraction method following the phase correction by means of the function $H_3$ the azimuth spectra of each sub-aperture are evaluated via the fourth multiplication unit in accordance with the RDM (Reflectivity Displacement Method) which performs a cross correlation of adjacent azimuth spectra, and the correction phase $H_{mc}(\tau, t; r_o)$ is multiplied in the fifth multiplication unit for the motion compensation with the SAR signal after the combination of the sub-apertures in the time domain.

* * * * *